United States Patent
Paielli et al.

(10) Patent No.: US 9,458,922 B2
(45) Date of Patent: Oct. 4, 2016

(54) LUBRICANT MANAGEMENT SYSTEM

(71) Applicant: Dana Automotive Systems Group, LLC, Maumee, OH (US)

(72) Inventors: Perry M. Paielli, Commerce Township, MI (US); Mike Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 233 days.

(21) Appl. No.: 14/062,188

(22) Filed: Oct. 24, 2013

(65) Prior Publication Data

US 2014/0116807 A1    May 1, 2014

Related U.S. Application Data (60) Provisional application No. 61/718,742, filed on Oct. 26, 2012.

(51) Int. Cl.
*F16H 57/04* (2010.01)
*F16K 31/06* (2006.01)

(52) U.S. Cl.
CPC ........ *F16H 57/0447* (2013.01); *F16H 57/045* (2013.01); *F16K 31/0606* (2013.01); *F16K 31/0651* (2013.01); *F16H 57/0409* (2013.01); *F16H 57/0483* (2013.01)

(58) Field of Classification Search
CPC ........... F16H 57/0447; F16K 31/0648; F16K 31/0655; F16K 31/0658; F16K 31/0606; F16K 31/0651
USPC ...................................... 251/129.02, 129.16
See application file for complete search history.

(56) References Cited

U.S. PATENT DOCUMENTS

| 1,631,217 | A | * | 6/1927 | Matthews | ............... B60R 17/00 184/13.1 |
| 2,860,850 | A | * | 11/1958 | Rhodes | ............... F16K 31/0651 251/129.21 |
| 3,410,519 | A | * | 11/1968 | Evans | ................. F16K 17/0493 251/129.16 |

(Continued)

FOREIGN PATENT DOCUMENTS

| DE | 3630973 A1 | 3/1987 |
| EP | 1918613 B1 | 1/2010 |

(Continued)

OTHER PUBLICATIONS

International Search Report with Written Opinion for PCT/US2013/066514.

*Primary Examiner* — Minh Truong
(74) *Attorney, Agent, or Firm* — Marshall & Melbourn, LLC (57) ABSTRACT

A lubricant management system for a vehicle is provided. The lubricant management system includes a housing, a power transmitting component, and a valve. The housing defines a lubricant passage therethrough. The power transmitting component is rotatingly disposed in the housing. The valve is at least partially disposed in the lubricant passage and has a first position and a second position. The valve in the first position militates against a flow of lubricant from a first portion of the housing to a second portion of the housing and the valve in the second position facilitates the flow of lubricant from the first portion of the housing to the second portion of the housing. The lubricant management system varies an amount of lubricant used in a sump of the housing in a simple and cost effective manner.

19 Claims, 6 Drawing Sheets

(56) References Cited

U.S. PATENT DOCUMENTS

| | | | | |
|---|---|---|---|---|
| 3,433,256 A | * | 3/1969 | Tobler | F16K 31/06 137/529 |
| 3,758,071 A | * | 9/1973 | Anderson | F16K 31/0655 251/129.21 |
| 4,300,595 A | * | 11/1981 | Mayer | F16K 1/34 137/625.33 |
| 6,105,931 A | * | 8/2000 | Frank | F16K 31/0606 251/129.15 |
| 6,299,561 B1 | | 10/2001 | Kramer et al. | |
| 6,651,953 B2 | * | 11/2003 | Weldon | F02M 25/0836 123/516 |
| 6,997,284 B1 | | 2/2006 | Nahrwold | |
| 8,671,981 B2 | * | 3/2014 | Lang | F16K 1/443 137/244 |
| 2009/0014248 A1 | * | 1/2009 | Yamashita | F01M 11/0004 184/6.24 |
| 2010/0108933 A1 | * | 5/2010 | Takeshita | F16K 31/0651 251/318 |
| 2010/0180721 A1 | | 7/2010 | Quehenberger | |
| 2010/0332089 A1 | | 12/2010 | Gianone et al. | |
| 2011/0000332 A1 | | 1/2011 | Gianone et al. | |
| 2011/0162482 A1 | | 7/2011 | Jacobs et al. | |
| 2013/0240174 A1 | * | 9/2013 | Matsusaka | F16K 15/028 165/41 |
| 2014/0084195 A1 | * | 3/2014 | Hakoda | F16K 31/0655 251/129.15 |
| 2014/0224891 A1 | * | 8/2014 | Matsusaka | F01P 7/14 236/34.5 |

FOREIGN PATENT DOCUMENTS

| | | |
|---|---|---|
| EP | 2270364 A1 | 1/2011 |
| JP | 48-1556 A | 1/1973 |
| JP | 59-1870 A | 1/1984 |

* cited by examiner

FIG. 12

LUBRICANT MANAGEMENT SYSTEM

CLAIM OF PRIORITY

The present application claims the benefit of priority to U.S. Provisional Application No. 61/718,742 filed on Oct. 26, 2012, which is incorporated herein in its entirety by reference.

FIELD OF THE INVENTION

The present invention relates to power transmission components and more specifically to gear lubrication systems.

BACKGROUND OF THE INVENTION

Conventionally, axle housings for a drive pinion, a differential assembly, and a pair of axles define a sump into which a volume of lubricant is disposed. The volume of lubricant reduces friction between the drive pinion and a ring gear of the differential assembly, between a pair of side gears and at least a pair of pinion carrier gears, and between components of a plurality of bearings disposed in the axle housing. In addition to reducing friction, the volume of lubricant also disperses heat generated between the moving parts. Depending on a temperature of the axle housing (which may be influenced by an ambient environment of the axle housing or an amount of heat generated by the components therein) and an operational condition of the components of the axle housing, an optimal amount of the volume of lubricant needed varies.

For example, the volume of lubricant disposed in the sump may be too large in many instances. During ordinary operation of a vehicle including the drive axle, when torque loads are well below a maximum amount, the volume of lubricant may result in excess windage of the drive pinion, the differential assembly, and the pair of axles. Such windage may also be exaggerated when the ambient environment of the axle housing is greatly reduced, such as in operation in cold weather. Additionally, during operation in cold weather, the volume of lubricant may disperse heat generated between the moving parts at a rate which prevents a viscosity of the volume of lubricant from decreasing, resulting in excess windage.

Simply reducing the volume of lubricant disposed in the sump to reduce windage results in many unintended consequences. During a torque intensive operation of a vehicle including the drive axle, when torque loads are at or near a maximum amount, a reduced volume of lubricant may not adequately reduce the friction generated by the drive pinion, the differential assembly, and the pair of axles. As a result, the components may wear excessively and operate in a noisy or harsh manner. Additionally, during operation of the axle housing using the reduced volume of lubricant, the lubricant may be unable to disperse heat generated between the moving parts at a rate which prevents premature degradation of the lubricant or damage to seals used in the axle housing.

It would be advantageous to develop a lubricant management system for an axle housing that varies an amount of lubricant used in a sump of the axle housing in a simple and cost effective manner.

SUMMARY OF THE INVENTION

Presently provided by the invention, a lubricant management system for an axle housing that varies an amount of lubricant used in a sump of the axle housing in a simple and cost effective manner, has surprisingly been discovered.

In one embodiment, the present invention is directed to a lubricant management system for a vehicle. The lubricant management system comprises a housing and a valve. The housing defines a lubricant passage therethrough. The valve is at least partially disposed in the lubricant passage and has a first position and a second position. The valve in the first position militates against a flow of lubricant from a first portion of the housing to a second portion of the housing and the valve in the second position facilitates the flow of lubricant from the first portion of the housing to the second portion of the housing.

In another embodiment, the present invention is directed to a lubricant management system for a vehicle. The lubricant management system includes a housing, a power transmitting component, and a valve. The housing defines an inlet conduit, a reservoir, an outlet conduit, a housing cavity, and a pair of openings. The housing cavity is separate from the reservoir. The reservoir is oriented between and adjacent to a pair of openings. The inlet conduit, the reservoir, and the outlet conduit form a lubricant passage through the housing. The power transmitting component is rotatingly disposed in the housing cavity. The valve is at least partially disposed in the lubricant passage and has a first position and a second position. The valve in the first position militates against a flow of lubricant from the reservoir to the outlet conduit of the housing and the valve in the second position facilitates the flow of lubricant from the reservoir to the outlet conduit of the housing.

In yet another embodiment, the present invention is directed to a lubricant management system for a vehicle. The lubricant management system includes a housing, a power transmitting component, and a valve. The housing defines a lubricant passage therethrough. The lubricant passage comprises an inlet conduit, a reservoir, and an outlet conduit. The power transmitting component is rotatingly disposed in the housing. The inlet conduit of the housing is oriented to collect at least a portion of a lubricant agitated by the power transmitting component. The valve is at least partially disposed in the lubricant passage and has a first position and a second position. The valve in the first position militates against a flow of lubricant from the reservoir to the outlet conduit of the housing and the valve in the second position facilitates the flow of lubricant from the reservoir to the outlet conduit of the housing.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 3:
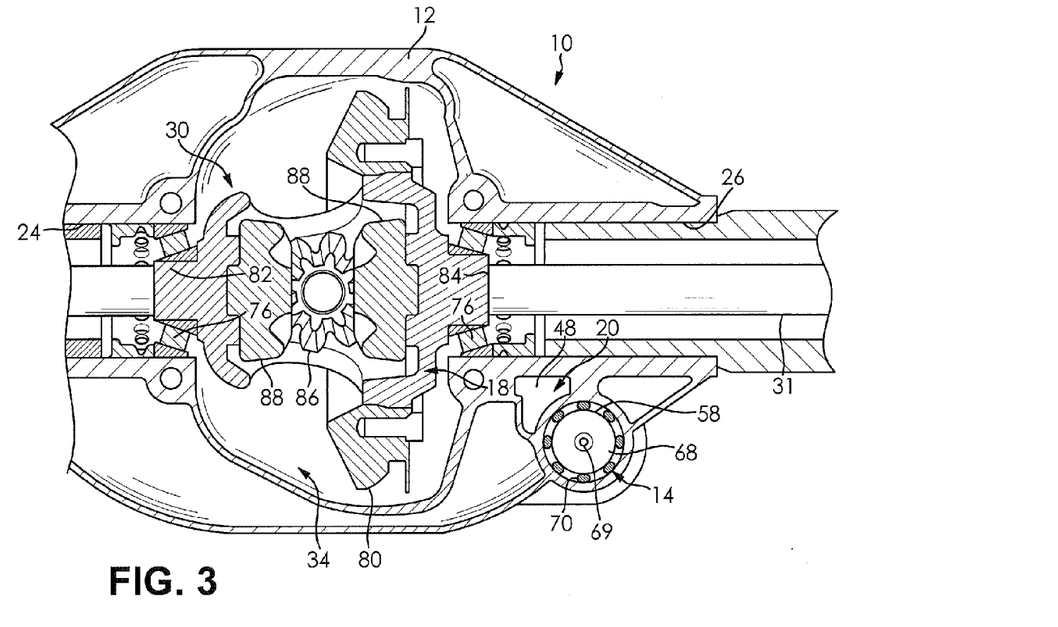
FIG. 3 is a front, cross-sectional view of the lubricant management system illustrated in FIG. 1, the cross-section adjacent the valve.
Figure 4:
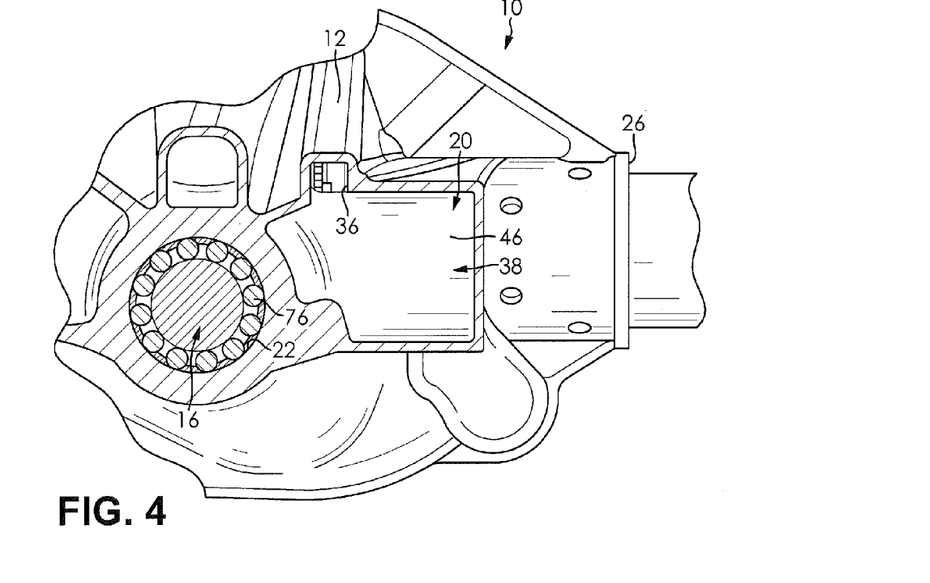
FIG. 4 is a front, cross-sectional view of the lubricant management system illustrated in FIG. 1, the cross-section through a reservoir of the lubricant management system, the cross-section adjacent the valve.
Figure 5:
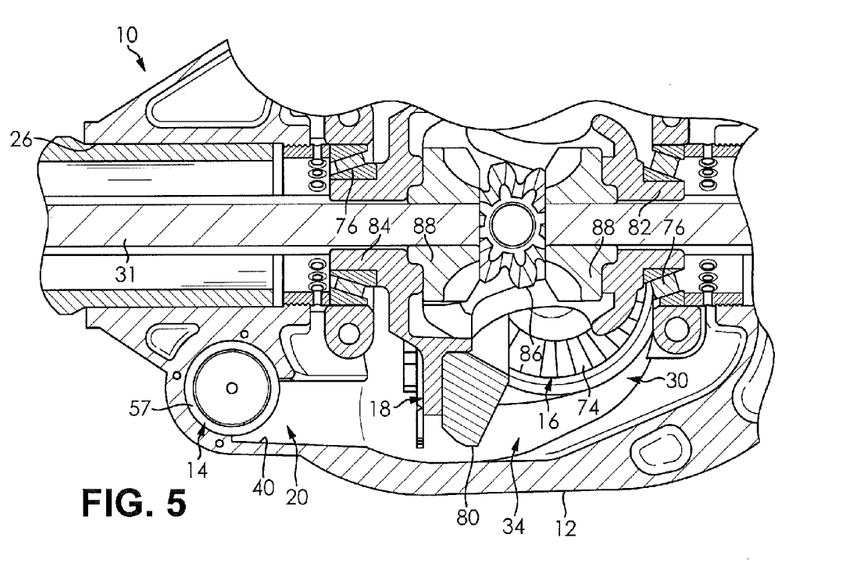
FIG. 5 is a rear, cross-sectional view of the lubricant management system illustrated in FIG. 1.
Figure 6:
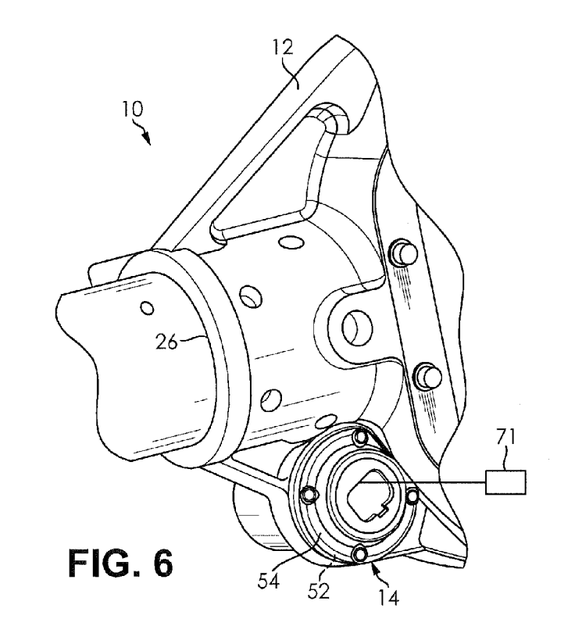
FIG. 6 is a perspective view of the lubricant management system illustrated in FIG. 1.

FIGS. 1-6 illustrate a lubricant management system 10 for a vehicle according to an embodiment of the present invention. The lubricant management system includes a housing 12, a valve 14, a first power transmitting component 16, and a second power transmitting component 18. The lubricant management system 10 forms a portion of a vehicle drivetrain; however, the lubricant management system 10 may be used in other applications. The housing 12 defines a lubricant passage 20 therethrough, which the valve 14 is disposed in and is most clearly shown in FIG. 2. As shown in FIG. 5, the first power transmitting component 16 is in driving engagement with the second power transmitting component 18. Further, the first power transmitting component 16 and the second power transmitting component 18 are rotatingly disposed in the housing 12. The first power transmitting component 16 (most clearly shown in FIGS. 4 and 5) is a drive pinion and the second power transmitting component 18 (most clearly shown in FIGS. 3 and 5) is a ring gear and differential housing assembly; however, it is understood that the first power transmitting component 16 and the second power transmitting component 18 may be other power transmitting components of the vehicle the lubricant management system 10 is incorporated in.

The housing 12 defines a first opening 22, a second opening 24, and a third opening 26. It is understood that the housing may also define other openings, which may be closed with a cover (not shown) removably coupled to the housing 12. The housing 12 is formed from a metal such as an aluminum or a steel; however, other metals may also be used. Typically, the housing 12 is cast and subsequently portions of the housing 12 are machined. As shown in FIGS. 1-6, the housing 12 is a differential housing, having the power transmitting components 16, 18, a differential 30, and an axle 31 rotatingly disposed in a housing cavity 34 thereof.

Figure 1:
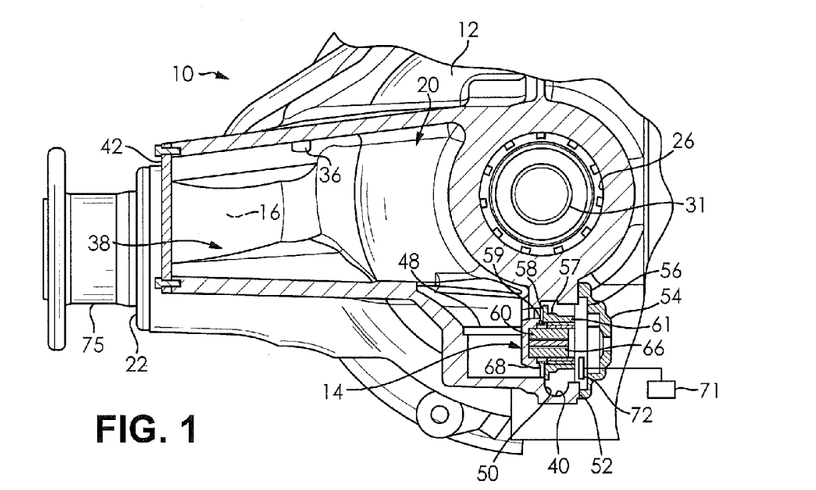
FIG. 1 is a side, cross-sectional view of a lubricant management system for a vehicle according to an embodiment of the present invention, the lubricant management system including a valve.

As shown in FIGS. 1, 4, and 5, the lubricant passage 20 comprises an inlet conduit 36, a reservoir 38, and an outlet conduit 40. As most clearly shown in FIG. 4, the inlet conduit 36 facilitates fluid communication between the housing cavity 34 and the reservoir 38. The housing cavity 34 is separate from the reservoir 38. The inlet conduit 36 may have a rectangular cross-section and may be substantially aligned with a portion of the second power transmitting component 18; however, it is understood that the inlet conduit 36 may be oriented in any manner suitable to collect a lubricant agitated by at least one of the first power transmitting component 16 and the second power transmitting component 18.

As shown in FIGS. 1 and 4, the reservoir 38 is a cavity defined by the housing 12. As mentioned hereinabove, the reservoir 38 is in fluid communication with the housing cavity 34 via the inlet conduit 36. As most clearly seen in FIGS. 1 and 4, the reservoir 38 is oriented between and adjacent to the first opening 22 and the third opening 26; however, it is understood that the reservoir 38 may be oriented between the first opening 22 and the second opening 24. Further, the reservoir 38 is in fluid communication with the housing cavity 34 via the outlet conduit 40. As most clearly shown in FIGS. 1 and 2, a reservoir cover 42, which partially defines the reservoir 38, sealingly engages and is removably coupled to the housing 12. Apertures formed in the housing 12 receive fasteners for removably coupling the reservoir cover 42 to the housing 12. The reservoir 38 comprises a holding volume 46 and a valving cavity 48.

As most clearly seen in FIGS. 1 and 4, the holding volume 46 may be a substantially rectangular prismatic cavity forming a portion of the reservoir 38. As most clearly seen in FIG. 4, the inlet conduit 36 joins the holding volume 46 at an uppermost portion of the housing 12 defining the lubricant passage 20; however, it is understood the inlet conduit 36 may join the holding volume 46 in any manner that permits the lubricant to collect in the reservoir 38.

Figure 2:
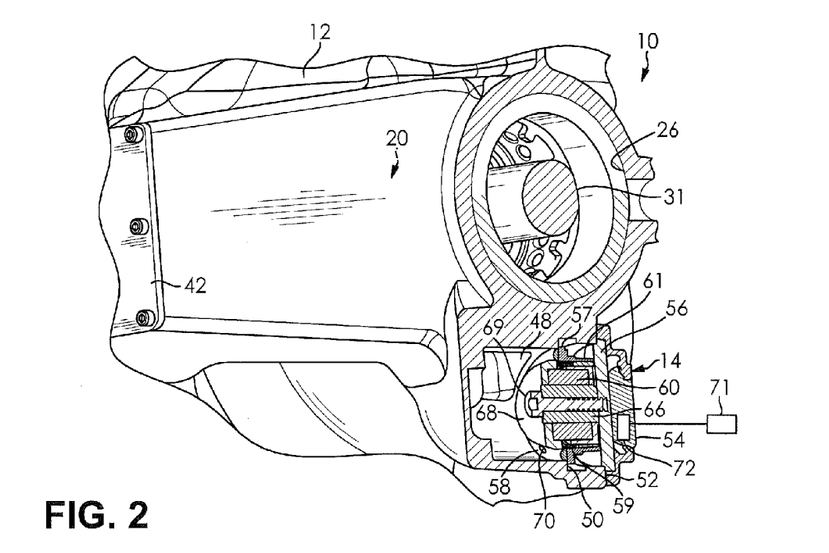
FIG. 2 is a perspective, cross-sectional view of the lubricant management system illustrated in FIG. 1.

As most clearly seen in FIGS. 1 and 2, the valving cavity 48 is a substantially cylindrical cavity forming a portion of the reservoir 38. The valving cavity 48 includes a valve seat 50 and a valving cavity end 52. The valve seat 50 is an annular recess formed adjacent the valve 14 that permits lubricant to flow therethrough when the valve 14 is placed in an open position. The valve 14 is disposed against the valving cavity end 52 and secured to the housing 12 with a valving cavity cover 54; however, it is understood the valve 14 may be coupled to or integrally formed with the valving cavity cover 54. As most clearly seen in FIGS. 1 and 5, the outlet conduit 40 joins the valving cavity 48 at the lowermost portion of the housing 12 defining the lubricant passage 20; however, it is understood the outlet conduit 40 may be configured in any other manner capable of draining the reservoir 38 and the valving cavity 48.

Figure 7:
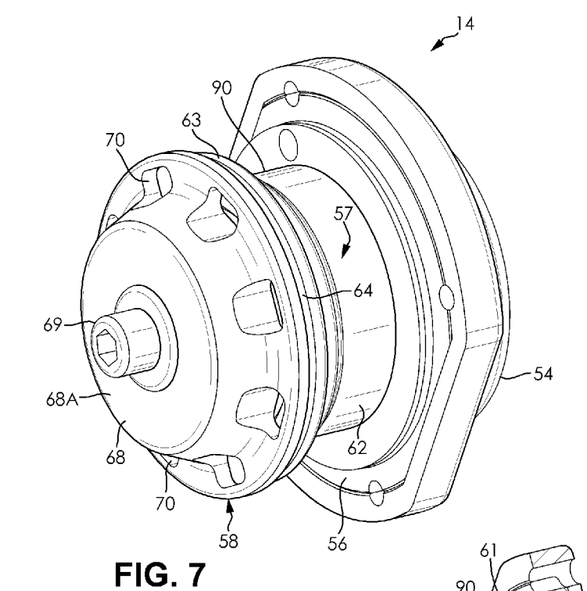
FIG. 7 is a perspective view of the valve of the lubricant management system illustrated in FIG. 1.
Figure 8:
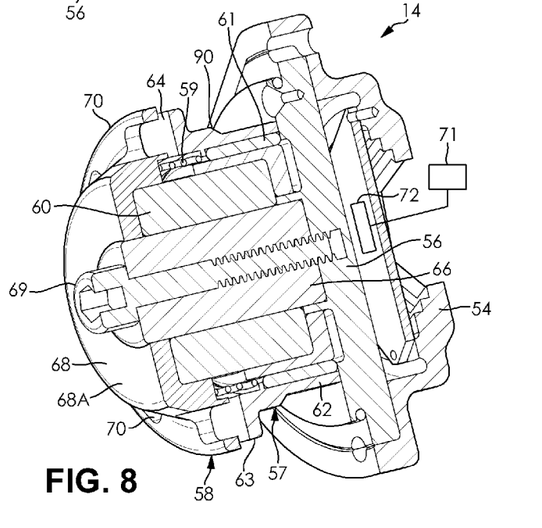
FIG. 8 is a perspective, cross-sectional view of the valve of the lubricant management system illustrated in FIG. 1.
Figure 9:
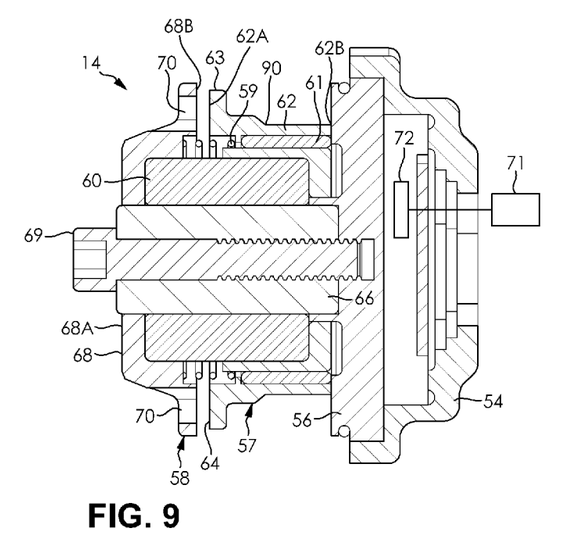
FIG. 9 is a side, cross-sectional view of the valve of the lubricant management system illustrated in FIG. 1.

As most clearly shown in FIGS. 7, 8, and 9, the valve 14 comprises an actuator portion.56, a sealing member 57, a perforated base portion 58, and a biasing member 59. When the valve 14 is disposed in the valving cavity 48, the perforated base 58 is sealingly engaged with the valve seat 50. The valve 14 is oriented below and adjacent the axle 31. The valve 14 has a first position and a second position. When the valve 14 is placed in the first position, the sealing member 57 is sealingly engaged with the perforated base 58, causing the lubricant entering the inlet conduit 36 to collect in the holding volume 46 and the valving cavity 48. When the valve 14 is placed in the second position, as shown in FIGS. 1 and 2, the sealing member 57 is spaced apart from the perforated base 58, allowing the lubricant entering the inlet conduit 36 to drain from the holding volume 46, the valving cavity 48, the valve seat 50, and the outlet conduit 40.

The actuator portion 56 is an electromechanical solenoid comprising a coil 60 and a piston guide 61; however, it is understood that other actuators, such as a hydraulic actuator, a pneumatic actuator, a mechanical actuator, or the like may also be used. The coil 60 is in electrical communication with the actuator portion 56. The piston guide 61 is a hollow cylinder disposed about the coil 60. The piston guide 61 is coupled to the coil 60. When an electrical current is applied to the coil 60, the sealing member 57 is urged across the piston guide 61 towards the perforated base 58.

The sealing member 57 is a hollow body having a main portion 62, a peripheral surface 90, and a sealing flange 63. The sealing member 57 is formed from steel; however, it is understood that the sealing member 57 may be formed from any ferrous material or the sealing member 57 may be partially formed from a ferrous material. The main portion 62 is a hollow cylinder, having a first side 62A and a second side 62B, which is disposed about the coil 60. As shown in FIGS. 7, 8, and 9, the main portion 62 may have a step formed therein; however, it is understood that the main portion 62 may have any shape. The peripheral surface 90 is defined by the outer surface of the sealing member 57. The sealing flange 63 is a ring shaped portion of the sealing member 57 that extends radially outwardly from the main portion 62. The sealing flange 63 is integrally formed with the main portion 62; but it is understood that the sealing flange 63 may be formed separate from the main portion 62 and coupled thereto in any conventional manner. The sealing flange 63 includes a sealing surface 64, which sealingly engages the perforated base 58 when the valve 14 is placed in the first position. As shown in FIGS. 7, 8, and 9, the sealing surface 64 is a flat surface; however, it is understood that features, such as ridges or recesses, may be formed in the sealing surface 64 to facilitate sealing engagement with the perforated base 58.

The perforated base 58 is a member coupled to the actuator portion 56. The perforated base 58 includes a shaft portion 66 and a base portion 68. As shown in FIGS. 7, 8, and 9, the shaft portion 66 may be formed separate from and coupled to the base portion 68; however, it is understood that the shaft portion 66 may be integrally formed with the base portion 68. The shaft portion 66 is a hollow cylinder having a first end disposed against the actuator portion 56. A fastener 69 is disposed through the shaft portion 66, coupling the perforated base 58 to the actuator portion. The base portion 68 extends radially from a second end of the shaft portion 66. The base portion 68 is a dish shaped member having a first end 68A and a second end 68B, and a plurality of lubricant perforations 70 formed through the first and second end 68A, 68B adjacent to an outer peripheral edge. When the valve 14 is disposed in the valving cavity 48, the base portion 68 sealingly engages the valve seat 50.

The biasing member 59 is a coil spring; however, it is understood that other biasing members may be used. The biasing member 59 is disposed about the coil 60 and has a first end that is disposed against a portion of the sealing member 57. A second end of the biasing member 59 is disposed against the base portion 68. When the valve 14 is assembled, the biasing member 59 is pre-loaded to urge the sealing member 57 away from the base portion 68. When an electrical current is applied to the coil 60, the sealing member 57 is urged towards the perforated base 58, compressing the biasing member 59 between the sealing member 57 and the base portion 68 and sealingly engaging the sealing member 57 with the perforated base 58.

The valving cavity cover 54 is a member coupled to the actuator portion 56 and is sealingly disposed against the valving cavity end 52 when the valve 14 is disposed in the housing 12 and secured therein using a plurality of threaded fasteners (not shown); however, it is understood other fasteners may be used. The valving cavity cover 54 is formed by molding a plastic; however, it is understood that the valving cavity cover 54 may be formed from other materials. The valving cavity cover 54 may include at least a portion of a controller (not shown) or may facilitate electrical communication between a controller 71 (shown schematically in FIGS. 6-9) and the coil 60. The valving cavity cover 54 may facilitate electrical communication between the controller 71 and the coil 60 through the use of a plug style electrical fitting. Further, it is understood that the valving cavity cover 54 may include at least one sensor 72 used with the lubricant management system 10. As a non-limiting example, the at least one sensor 72 included in the valving cavity cover 54 may be a temperature sensor, which may be used to monitor a temperature of the lubricant in the housing 12 or a temperature of the valve 14.

The first power transmitting component 16 is a drive pinion having a gear 74 formed on a first end thereof. Typically, the first power transmitting component 16 is of a unitary construction, but it is understood that the first power transmitting component 16 may be formed from a plurality of components. As shown in FIG. 1, a second end of the first power transmitting component 16 is splined and fitted with an end fitting 75 for coupling the first power transmitting component 16 to a universal joint (not shown) and a prop shaft (not shown). However, it is understood that the first power transmitting component 16 may be coupled to a prime mover, a transmission, a clutch, or another type of joint. The first power transmitting component 16 is rotatably supported within the first opening 22 by a plurality of bearings 76 disposed in the housing 12. At least one seal (not shown) is also disposed between the first power transmitting component 14 and the housing 12.

The second power transmitting component 18 is a differential case as is known in the art having a ring gear 80 coupled thereto. The second power transmitting component 18 is rotatably supported within the housing 12 by a first neck portion 82 and a second neck portion 84. The first neck portion 82 is supported by a bearing 76 disposed in the second opening 24 of the housing 12. The second neck portion 84 is supported by a bearing 76 disposed in the third opening 26 of the housing 12. At least two drive pinions 86 are rotatably coupled to the second power transmitting component 18 and a pair of side gears 88 rotatably journaled within the second power transmitting component 18 form the differential 30, as known in the art.

The ring gear 80 is an annular hypoid gear coupled to a radial flange portion of the second power transmitting component 18. As shown in FIGS. 3 and 5, the ring gear 80 is coupled to the second power transmitting component 18 with a plurality of fasteners, but it is understood that the ring gear 80 may be coupled with a weld or may be unitarily formed with the second power transmitting component 16. The ring gear 80 is drivingly engaged with the gear 74 of the first power transmitting component 16. Thus, a torque applied to the first power transmitting component 16 drives the second power transmitting component 18 and the drive pinions 86 disposed therein.

Figure 10:
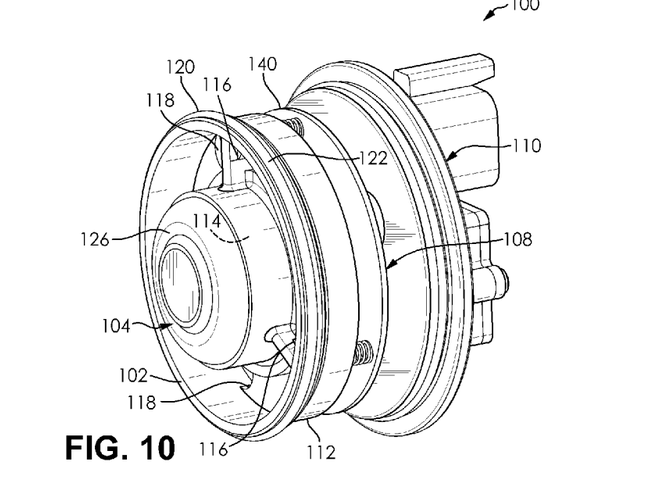
FIG. 10 is a perspective view of a valve of a lubricant management system for a vehicle according to another embodiment of the present invention.
Figure 11:
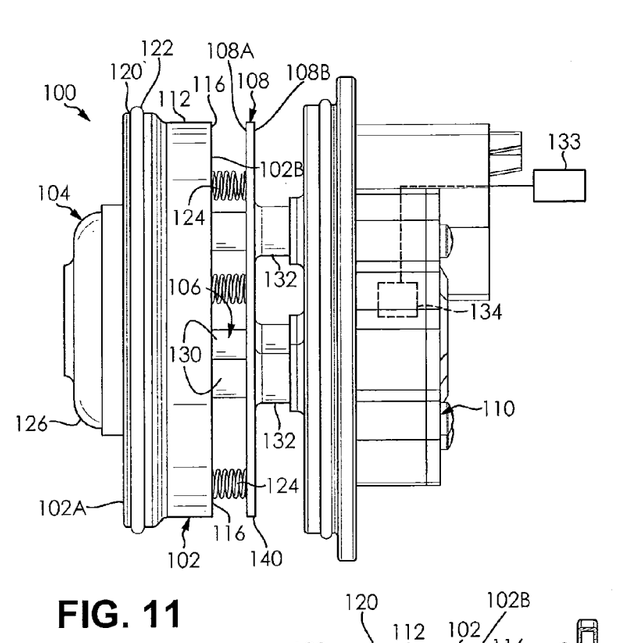
FIG. 11 is a perspective view of the valve illustrated in FIGS. 10.
Figure 12:
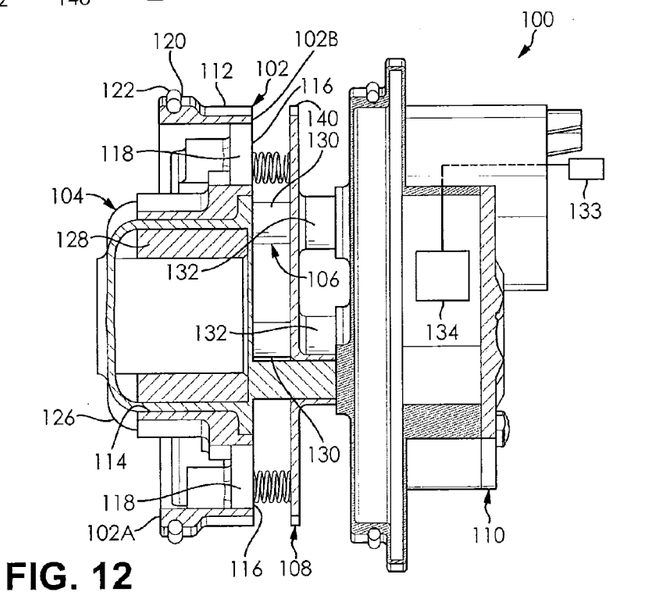
FIG. 12 is a perspective, cross sectional view of the valve illustrated in FIG. 10.

FIGS. 10-12 show an alternate embodiment of the valve 14. A valve 100 may be disposed in the lubricant passage 20 of the housing 12. The valve 100 comprises a base portion 102, a coil assembly 104, a guide member 106, a sealing member 108, and a valving cavity cover 110.

The base portion 102 is a ring shaped body disposed on the coil 104. The base portion 102 is coupled to the coil assembly 104. The base portion 102 is spaced apart from the valving cavity cover 110; and an area therebetween is aligned with the outlet conduit 40. The base portion 102 comprises an outer surface 112, an inner surface 114, a plurality of biasing member apertures 116, a first end 102A, a second end 102B, and a plurality of lubricant perforations 118 through the first end 102A and the second end 102B. The base portion 102 is formed by molding a plastic; however, it is understood that the base portion 102 may be formed from any other material. A side of the base portion 102 facing the valving cavity cover 110 may include an annular seal disposed therein for engaging the sealing member 108.

The outer surface 112 of the base portion 102 is shaped to correspond to a portion of the valving cavity 48, which the base portion 102 is sealingly engaged therewith. As shown in FIGS. 10-12, the outer surface 112 is cylindrical in shape; however, it is understood that other shapes may be used. The outer surface 112 includes a seal groove 120 formed therein. An O-ring 122 is disposed in the seal groove 120, and facilitates sealing engagement between the base portion 102 and the valving cavity 48.

The inner surface 114 of the base portion 102 is shaped to correspond to an outer surface of the coil assembly 104, and is engaged therewith using a press fit; however, it is understood that the base portion 102 may be coupled to the coil assembly 104 using any conventional fastener or an adhesive.

The plurality of biasing member apertures 116 are formed in the base portion 102 between the outer surface 112 and the inner surface 114. As shown in FIGS. 10-12, the base portion 102 includes three biasing member apertures 116 spaced about the base portion 102 in an equiangular manner; however it is understood that any number of biasing member apertures 116 may be formed in the base portion 102. The plurality of biasing member apertures 116 open towards the valving cavity cover 110, as most clearly seen in FIG. 11. A biasing member 124 is disposed in each of the biasing member apertures 116. Alternately, it is understood that the biasing member aperture 116 may comprise an annular groove formed in the base portion 102 for receipt of a single biasing member.

The plurality of lubricant perforations 118 are formed through the base portion 102 between the outer surface 112 and the inner surface 114. As shown in FIGS. 10 and 12, the base portion 102 includes six lubricant perforations 118 spaced about the base portion 102 in an equiangular manner; however it is understood that any number of lubricant perforations 118 may be formed through the base portion 102. The plurality of lubricant perforations 118 facilitates fluid communication through the base portion 102 when the base portion 102 is sealingly engaged with the valving cavity 48.

The coil assembly 104 is a substantially cylindrical shaped body disposed in the base portion 102. The coil assembly 104 is spaced apart from the valving cavity cover 110. The coil assembly 104 comprises a cover portion 126 and a coil portion 128. The cover portion 126 is a hollow body into which the coil portion 128 is disposed. The cover portion 126 is formed by molding a plastic; however, it is understood that the cover portion 126 may be formed from other materials. The coil portion 128 is in electrical communication with a portion of the valving cavity cover 110.

The guide member 106 is a substantially disk shaped body having a plurality of protuberances 130 extending therefrom. The guide member 106 is coupled to at least one of the coil assembly 104 and the base portion 102. The protuberances 130 are coupled to the valving cavity cover 110 and space the base portion 102 away from the valving cavity cover 110. At least one of the protuberances 130 is hollow and acts as conduit to permit electrical communication to be facilitated between the valving cavity cover 110 and the coil. The guide member 106 is formed by molding a plastic; however, it is understood that the guide member 106 may be formed from other materials. Alternately, it is understood that the guide member 106 may be integrally formed with one of the valving cavity cover 110, the base portion 102, and the coil assembly 104.

The sealing member 108 is a substantially disk shaped body including a first side 108A and a second side 108B, the second side 108B having a plurality of plate guides 132 extending therefrom. The plate guides 132 are hollow protuberances corresponding to and sized to receive each of the protuberances 130. The sealing member 108 is slidingly disposed on the protuberances 130, and may be moved along the protuberances 130 to contact the base portion 102 or the valving cavity cover 110. The sealing member 108 substantially disk shaped body further comprises a peripheral surface 140 defined by the outer surface between the opposite sides of the sealing member 108. The sealing member 108 is formed from a ferrous material. The plurality of biasing members 124 disposed in the biasing member apertures 116 is also disposed against the sealing member 108. As shown in FIG. 11, the sealing member 108 is urged towards the valving cavity cover 110 by the plurality of biasing members 124.

The valving cavity cover 110 is a member coupled to the protuberances 130 of the guide member 106 and is sealingly disposed against the valving cavity end 52 when the valve 100 is disposed in the housing 12 and secured therein using a snap ring (not shown); however, it is understood other fasteners may be used. The valving cavity cover 110 is formed by molding a plastic; however, it is understood that the valving cavity cover 110 may be formed from other materials. The valving cavity cover 110 may include at least a portion of a controller (not shown) or may facilitate electrical communication between a controller 133 (shown schematically in FIGS. 10-12) and the coil portion 128. The valving cavity cover 110 may facilitate electrical communication between the controller 133 and the coil portion 128 through the use of a plug style electrical fitting. Further, it is understood that the valving cavity cover 110 may include at least one sensor 134 used with the lubricant management system 10. As a non-limiting example, the at least one sensor 134 included in the valving cavity cover 110 may be a temperature sensor, which may be used to monitor a temperature of the lubricant in the housing 12 or a temperature of the valve 100.

The valve 100 has a first position and a second position. When the valve 100 is placed in the first position, the sealing member 108 is sealingly engaged with the perforated base portion 102, causing the lubricant entering the inlet conduit 36 to collect in the holding volume 46 and the valving cavity 48. When the valve 100 is placed in the second position, as shown in FIGS. 10 and 12, the sealing member 108 is spaced apart from the base portion 102 by the plurality of biasing member 124 which urge the sealing member away from the base portion 102, allowing the lubricant entering the inlet conduit 36 to drain from the holding volume 46, the valving cavity 48, through the base portion 102, and the outlet conduit 40.

In use, the lubricant management system 10 for the vehicle collects a portion of the lubricant in the reservoir 38 to reduce windage of the first power transmitting component 16 and the second power transmitting component 18, to reduce any losses associated with the bearings 76, to reduce a thermal mass of the lubricant not disposed in the reservoir 38, and to reduce losses associated with any other moving portion of the lubricant management system 10. During operation of the vehicle, particularly, when the second power transmitting component 18 is rotating, a portion of the lubricant adjacent the ring gear 80, accelerated outwardly by the rotation of the ring gear 80, is thrown against the housing 12 in a predictable manner. By placing the inlet conduit 36 in a location of the housing 12 the lubricant is typically thrown against, a portion of the thrown lubricant enters the reservoir 38. Depending on a position of the valve 14, 100, the lubricant management system 10 one of collects a volume of the lubricant in the reservoir 38 or permits the thrown lubricant to pass through the lubricant passage 20.

When it is desired for the valve 14 to be placed in the first position, such as determined by the controller 71 in communication with the valve 14 and the at least one sensor 72, the actuator portion 56 receives an electrical current. The electrical current passing through the coil 60 generates a magnetic field which urges the sealing member 57 along the piston guide 61 and the coil 60 towards the perforated base 58, which compresses the biasing member 59. Upon contact of the sealing surface 64 of the sealing member 57 with the base portion 68 of the perforated base 58, the lubricant passage 20 is configured to collect a volume of the lubricant in the reservoir 38. The electrical current may be a pulse width modulated electrical current. When the valve 14 is placed in the first position, a duty cycle of the pulse width modulated electrical current may be reduced without affecting a position of the valve 14. As a non-limiting example, the duty cycle of the pulse width modulated electrical current may be reduced by about 80%.

When it is desired for the valve 100 to be placed in the first position, such as determined by the controller 133 in communication with the valve 100 and the at least one sensor 134, the coil portion 128 receives an electrical current, which is communicated to the coil portion 128 through the valving cavity cover 110 and the guide member 106. The electrical current passing through the coil portion 128 generates a magnetic field which urges the sealing member 108 along the plate guides 132 towards the base portion 102, which compresses the plurality of biasing members 124. Upon contact of the sealing member 108 with the base portion 102, the lubricant passage 20 is configured to collect a volume of the lubricant in the reservoir 38. The electrical current may be a pulse width modulated electrical current. When the valve 100 is placed in the first position, a duty cycle of the pulse width modulated electrical current may be reduced without affecting a position of the valve 100. As a non-limiting example, the duty cycle of the pulse width modulated electrical current may be reduced by about 80%.

The controller 71, 133 is also used to determine the position of the valve 14, 100. The position of the valve 14, 100 may be determined by inferring an amount of inductance of the coil 60 or the coil portion 128 and any ferrous metal adjacent the coil 60 or the coil portion 128. The inductance of the coil 60 or the coil portion 128 and any ferrous metal adjacent the coil 60 or the coil portion 128 varies with a position of the sealing member 57 or the sealing member 108. To infer the inductance of the coil 60 or the coil portion 128 and any ferrous metal adjacent the coil 60 or the coil portion 128, the duty cycle of the pulse width modulated electrical current is increased for a predetermined amount of cycles. The controller 71, 133, by sensing a rate the current changes, can determine the inductance of the coil 60 or the coil portion 128 and any ferrous metal adjacent the coil 60 or the coil portion 128, and thus the position of the sealing member 57 or the sealing member 108. By knowing the position of the sealing member 57 or the sealing member 108, the controller 71, 133 can determine if the valve 14, 100 is in the first position or the second position. As a non-limiting example, the controller 71, 133 may determine the position of the valve 14, 100 on a periodic basis, such as once a second. It is understood that the controller 71, 133 may relay the position of the valve 14, 100 to another control system of the vehicle the lubricant management system 10 is incorporated in.

Once the valve 14, 100 is placed in the first position, the lubricant entering the inlet conduit 36 begins to fill the reservoir 38. The lubricant that enters the reservoir 38 flows into and collects in the valving cavity 48 and the holding volume 46. Upon a level of the lubricant in the reservoir 38 reaching the height of the inlet conduit 36, additional lubricant is prevented from entering the reservoir 38, and remains in the housing cavity 34. The valving cavity 48 and the holding volume 46 are configured to hold a predetermined amount of lubricant necessary to reduce windage of the first power transmitting component 16 and the second power transmitting component 18 and to reduce a thermal mass of the lubricant remaining in the housing cavity 34.

When it is desired for the valve 14, 100 to be placed in the second position, such as determined by the controller 71, 133 in communication with the valve 14, 100 and the at least one sensor 72, 134, the controller 71, 133 does not send the electrical current to the actuator portion 56 or the coil portion 128. Without the electrical current, the coil 60 or the coil portion 128 does not generate the magnetic field which urges the sealing member 57 towards the perforated base 58 or the sealing member 108 towards the base portion 102. The biasing member 59 or the plurality of biasing members 124, which are in a compressed state, decompress and urges the sealing member 57 away from the perforated base 58, disengaging the sealing surface 64 from the base portion 68 or decompress and urge the sealing member 108 away from the base portion 102, disengaging the sealing member 108 from the base portion 102. The lubricant entering the reservoir 38 is free to flow through the perforated base 58 and the valve seat 50 or the base portion 102, and out of the reservoir 38 through the outlet conduit 40. Accordingly, when the valve 14, 100 is placed in the second position, no significant volume of the lubricant is retained in the reservoir 38. The valve 14, 100 may be placed in the second position when the controller 71, 133 determines one or more conditions exist.

As non-limiting examples, the valve 14, 100 may be placed in the second position when a temperature of the lubricant in the housing cavity 34 is above a predetermined threshold, when a temperature of the lubricant in the housing cavity 34 is below a predetermined threshold, when a temperature of the controller 71, 133 or a portion of the controller incorporated into the valve is above a predetermined threshold, when a rate of change of the temperature of the lubricant in the housing cavity 34 is above a predetermined threshold, when a speed of the vehicle the lubricant management system 10 is incorporated in is less than a predetermined value, based on a rotational speed of the first power transmitting component 16 and the second power transmitting component 18 (which may be determined based on information available to the controller 71, 133 over a controller area network of the vehicle), and when the vehicle is placed in a high load condition.

The high load condition may be determined by the sensor 72, 134 and the controller 71, 133. As non-limiting examples, the high load condition may be determined by an operating condition of one or more components of the vehicle, a sensor used with one or more components of the vehicle (such as a transfer case), or by interpreting information available to the controller 71, 133 over the controller area network of the vehicle.

The controller 71, 133 or the portion of the controller incorporated into the valve 14, 100 may also perform a variety of other functions for the vehicle the lubricant management system 10 is incorporated in. The controller 71, 133 or the portion of the controller may be used to monitor a temperature of the lubricant in the housing 12 for purposes other than control of the valve 14, 100, to monitor a temperature of the valve 14, 100, to send and receive information over the controller area network of the vehicle, to check the functionality of any sensors incorporated into the lubricant management system 10, to perform a diagnostic check of the valve 14, 100 when the vehicle the lubricant management system 10 is incorporated in is started, and to diagnose input and output problems of one of the valve 14, 100 and the controller 71, 133.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A lubricant management system for a vehicle, comprising:
   a housing defining a lubricant passage therethrough, the lubricant passage comprising an inlet conduit, a reservoir, and an outlet conduit;
   a power transmitting component rotatingly disposed in the housing, the inlet conduit of the housing oriented to collect at least a portion of a lubricant agitated by the power transmitting component; and
   a valve at least partially disposed in the lubricant passage having a first position and a second position, wherein the valve in the first position militates against a flow of lubricant from the reservoir to the outlet conduit of the housing and the valve in the second position facilitates the flow of lubricant from the reservoir to the outlet conduit of the housing;
   the valve comprising a sealing member and a base portion, the base portion including a plurality of base portion guide protuberances coupled with a valving cavity cover;
   the sealing member comprising a first side and a second side disposed opposite the first side, wherein the first side is sealingly engaged with the base portion when the valve is in the first position and spaced apart from the base portion when the valve is in the second position;
   the sealing member including a plurality of sealing member hollow guide protuberances, the base portion guide protuberances disposed at least partially inside the sealing member hollow guide protuberances;
   the valve further comprising the valving cavity cover sealingly engaged with the housing; and
   the valving cavity cover disposed adjacent to the second side of the sealing member.

2. A lubricant management system for a vehicle, comprising:
   a housing defining a lubricant passage therethrough;
   a valve at least partially disposed in the lubricant passage having a first position and a second position, wherein the valve in the first position militates against a flow of lubricant from a first portion of the housing to a second portion of the housing and the valve in the second position facilitates the flow of lubricant from the first portion of the housing to the second portion of the housing;
   the valve comprising a sealing member and a base portion;
   the base portion having a first end and a second end, the second end including a plurality of base portion guide protuberances coupled with a valving cavity cover;
   the first end and the second end defining a plurality of perforations therethrough, whereby the perforations have an inlet in the base portion first end and an outlet in the base portion second end;
   the sealing member comprising a side including a plurality of sealing member hollow guide protuberances; and
   the base portion guide protuberances disposed at least partially inside the sealing member hollow guide protuberances.

3. The lubricant management system for a vehicle according to claim 2, wherein the housing defines an inlet conduit, a reservoir, and an outlet conduit which form the lubricant passage.

4. The lubricant management system for a vehicle according to claim 3, wherein the lubricant management system further comprises a power transmitting component rotatingly disposed in the housing.

5. The lubricant management system for a vehicle according to claim 3, wherein the reservoir is oriented between and adjacent to a pair of openings, the pair of openings defined by the housing.

6. The lubricant management system for a vehicle according to claim 3, wherein a portion of the reservoir is defined by a cover which sealingly engages and is removably coupled to the housing.

7. The lubricant management system for a vehicle according to claim 3, wherein the valve is oriented below and adjacent an axle which is rotatingly disposed in the housing.

8. The lubricant management system for a vehicle according to claim 2, wherein the sealing member is sealingly engaged with the base portion when the valve is in the first position and the sealing member is spaced apart from the base portion when the valve is in the second position.

9. The lubricant management system for a vehicle according to claim 8, wherein the base portion is sealingly engaged with a portion of the housing defining the lubricant passage.

10. The lubricant management system for a vehicle according to claim 8, wherein at least a portion of the sealing member is formed from a ferrous material.

11. The lubricant management system for a vehicle according to claim 8, wherein the valve further comprises a coil in electrical communication with a controller.

12. The lubricant management system for a vehicle according to claim 11, wherein the controller may be used to determine a position of the valve based on an amount of inductance of the coil.

13. The lubricant management system for a vehicle according to claim 8, wherein the valve further comprises at least one biasing member disposed between the base portion and the sealing member.

14. The lubricant management system for a vehicle according to claim 8, wherein the valve further comprises the valving cavity cover sealingly engaged with the housing.

15. The lubricant management system for a vehicle according to claim 8, wherein the housing defines a housing cavity into which the power transmitting component is rotatingly disposed, the housing cavity separate from the reservoir.

16. The lubricant management system for a vehicle according to claim 8, wherein the inlet conduit is oriented to collect at least a portion of a lubricant agitated by the power transmitting component.

17. The lubricant management system for a vehicle according to claim 2, wherein the valve further comprises a sensor in communication with a controller.

18. A lubricant management system for a vehicle, comprising:

a housing defining an inlet conduit, a reservoir, an outlet conduit, a housing cavity, and a pair of openings, the housing cavity separate from the reservoir, the reservoir oriented between and adjacent to the pair of openings, and the inlet conduit, the reservoir, and the outlet conduit forming a lubricant passage through the housing;

a power transmitting component rotatingly disposed in the housing cavity; and a valve at least partially disposed in the lubricant passage having a first position and a second position, wherein the valve in the first position militates against a flow of lubricant from the reservoir to the outlet conduit of the housing and the valve in the second position facilitates the flow of lubricant from the reservoir to the outlet conduit of the housing;

the valve comprising a sealing member and a base portion, the base portion including a plurality of base portion guide protuberances coupled with a valving cavity cover;

the sealing member comprising a first side and a second side disposed opposite the first side, the sealing member including a plurality of sealing member hollow guide protuberances, the base portion guide protuberances disposed at least partially inside the sealing member hollow guide protuberances.

19. The lubricant management system for a vehicle according to claim 18, wherein the valve further comprises at least one biasing member disposed between the base portion and the sealing member.

* * * * *

UNITED STATES PATENT AND TRADEMARK OFFICE
CERTIFICATE OF CORRECTION

PATENT NO. : 9,458,922 B2  
APPLICATION NO. : 14/062188  
DATED : October 4, 2016  
INVENTOR(S) : Perry M. Paielli et al.

Page 1 of 1

It is certified that error appears in the above-identified patent and that said Letters Patent is hereby corrected as shown below:

On the Title Page

Item [72], delete the name of the inventor "Mike Z. Creech" and insert --Michael Z. Creech.--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*